US008750684B2

(12) United States Patent
Sproule et al.

(10) Patent No.: US 8,750,684 B2
(45) Date of Patent: Jun. 10, 2014

(54) MOVIE MAKING TECHNIQUES

(75) Inventors: William D. Sproule, Woodinville, WA (US); Mindy C. King, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 962 days.

(21) Appl. No.: 12/244,706

(22) Filed: Oct. 2, 2008

(65) Prior Publication Data

US 2010/0086276 A1   Apr. 8, 2010

(51) Int. Cl.
*H04N 5/93*   (2006.01)
*G11B 27/00*   (2006.01)
*H04N 9/80*   (2006.01)

(52) U.S. Cl.
USPC ............................ 386/278; 386/239; 386/248

(58) Field of Classification Search
USPC .......................... 386/239, 240, 248, 278–290
See application file for complete search history.

(56) References Cited

U.S. PATENT DOCUMENTS

| 6,065,042 | A  | * | 5/2000 | Reimer et al. | ................ | 709/203 |
| 6,970,639 | B1 | * | 11/2005 | McGrath et al. | ............. | 386/290 |
| 7,191,190 | B2 |  | 3/2007 | Debique et al. | | |
| 2003/0093790 | A1 | * | 5/2003 | Logan et al. | .................... | 725/38 |
| 2004/0223747 | A1 |  | 11/2004 | Otala | | |
| 2004/0254904 | A1 | * | 12/2004 | Nelken et al. | ................... | 706/50 |
| 2005/0015713 | A1 |  | 1/2005 | Plastina | | |
| 2006/0149781 | A1 |  | 7/2006 | Blankinship | | |
| 2006/0224940 | A1 |  | 10/2006 | Lee | | |
| 2007/0150517 | A1 |  | 6/2007 | Malone | | |

OTHER PUBLICATIONS

Casares, Juan et al., "Simplifying Video Editing Using Metadata", http://informedia.cs.cmu.edu/documents/silver-dis02-draft.pdf, 1-10.
"Add Movie Metadata from Amazon's Database to Your MP4s Easily with MetaX", http://www.gooddvdstuff.com/news/news/2712.html, (Feb. 5, 2008), 2 pages.
"Creating an Application for Automatic Annotation of Images and Video", http://www.image.ntua.gr/swamm2006/resources/paper20.pdf, 10 pages.
"Video Metadata Model", http://microformats.org/wiki/video-metadata-model, 6 pages.
Casares, Juan et al., "Simplifying Video Editing Using Metadata", Retrieved from: <http://informedia.cs.cmu.edu/documents/silver-dis02-draft.pdf> on Jul. 28, 2008. Proceedings of the 4th conference on Designing Interactive Systems: Processes, Practices, Methods, and Techniques, (2002), pp. 157-166.

* cited by examiner

*Primary Examiner* — Hung Dang
(74) *Attorney, Agent, or Firm* — Sung Kim; Andrew Sanders; Micky Minhas

(57) ABSTRACT

In an implementation, a plurality of media is collected, each having associated metadata that describes respective media. A movie is made from the plurality of media having a credit sequence and a title sequence that are generated automatically and without user intervention from the metadata.

20 Claims, 5 Drawing Sheets

MOVIE MAKING TECHNIQUES

BACKGROUND

Users are able to record media in an ever increasing variety of ways. For example, users traditionally employed cameras to take photos and videos for a variety of different purposes, such as to record a vacation, memorialize what happened at a social event (e.g., birthday party, graduation, or wedding), for business purposes, and so on. However, these cameras typically provided an output that was in a fixed state. Accordingly, this output was difficult to modify and/or combine with other media. For example, photographs and videos were traditionally output "as is" using different mediums, e.g., paper and film. Thus, it was difficult using traditional techniques to combine one type of media with another into a coherent viewing experience, such as to combine paper photographs with film videos.

Accordingly, people using these types of media were traditionally limited to viewing the different types of media separately, such as to view a photo album and movie separately. Additionally, combinations of similar types of media were also difficult to form, such as to combine movies that were provided using film. Although digital techniques were subsequently developed such that media was stored and manipulated electronically, these digital techniques were perceived as being difficult to use, manually intensive, and involving a high level of sophistication on the part of the users to be performed successfully. Thus, users would often choose to forgo these techniques due to these perceived difficulties.

SUMMARY

Movie making techniques are described. In an implementation, a method is performed by a computing device in which metadata is extracted from each of a plurality of media and a sequence is calculated for output of the plurality of media based on the extracted metadata. A movie is then formed having the plurality of media in the calculated sequence.

In an implementation, a plurality of media is collected, each having associated metadata that describes respective media. A movie is made from the plurality of media having a credit sequence and a title sequence that are generated from the metadata automatically and without user intervention.

In an implementation, one or more computer-readable media include instructions that are executable to generate a credit sequence to be included as a part of a movie from metadata associated with a plurality of media used to make the movie.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Users have access to a variety of different types of devices that may be used to capture a variety of different types of media. Consequently, it may be difficult to create a unified viewing experience from the different media using traditional techniques.

Techniques to make movies are described, that may be used to combine media into a movie. In an implementation, different and/or similar types of media may be combined automatically and without user intervention such that a coherent experience may be achieved. For example, a user may specify particular media such as home videos, pictures, and music to be combined into a movie. A movie module, which may be executed locally at a client and/or remotely over a network (e.g., at a website) may analyze metadata associated with the media to determine a particular sequence to output the media. This sequence may be based on a variety of different factors, such as time (e.g., through date stamps), location (e.g., through geo-coding), clustering of similar metadata (e.g., to keep actors consistent across segments of the movie), combinations of the different factors, and so on. Additionally, transitions may be supplied between the media by the movie module, such as a "fade" from one item of media to another.

Further, metadata associated with the media may be used for a variety of other purposes. In an implementation, a credit and/or title sequence may be automatically generated without user interaction based on the metadata. For example, the credit sequence may describe people included in the content as actors, generate a title based on common metadata, include "location" data, supply a producer based on a user login ID (e.g., as a part of a website that hosts the movie making functionality), and so on. The credit sequence may be generated for inclusion as an integral part of a movie, e.g., as a "credits roll" at the end of the movie. In this way, the metadata may be leveraged to form a coherent viewing experience that includes an output of the metadata in a way that may be of interest to a user.

In the following discussion, an example environment is first described that is operable to perform one or more techniques that pertain to a movie module and making a movie using media. Example procedures are then described which may be implemented using the example environment as well as other environments. Accordingly, implementation of the procedures is not limited to the example environment and the example environment is not limited to implementation of the example procedures.

Example Environment

Figure 1:
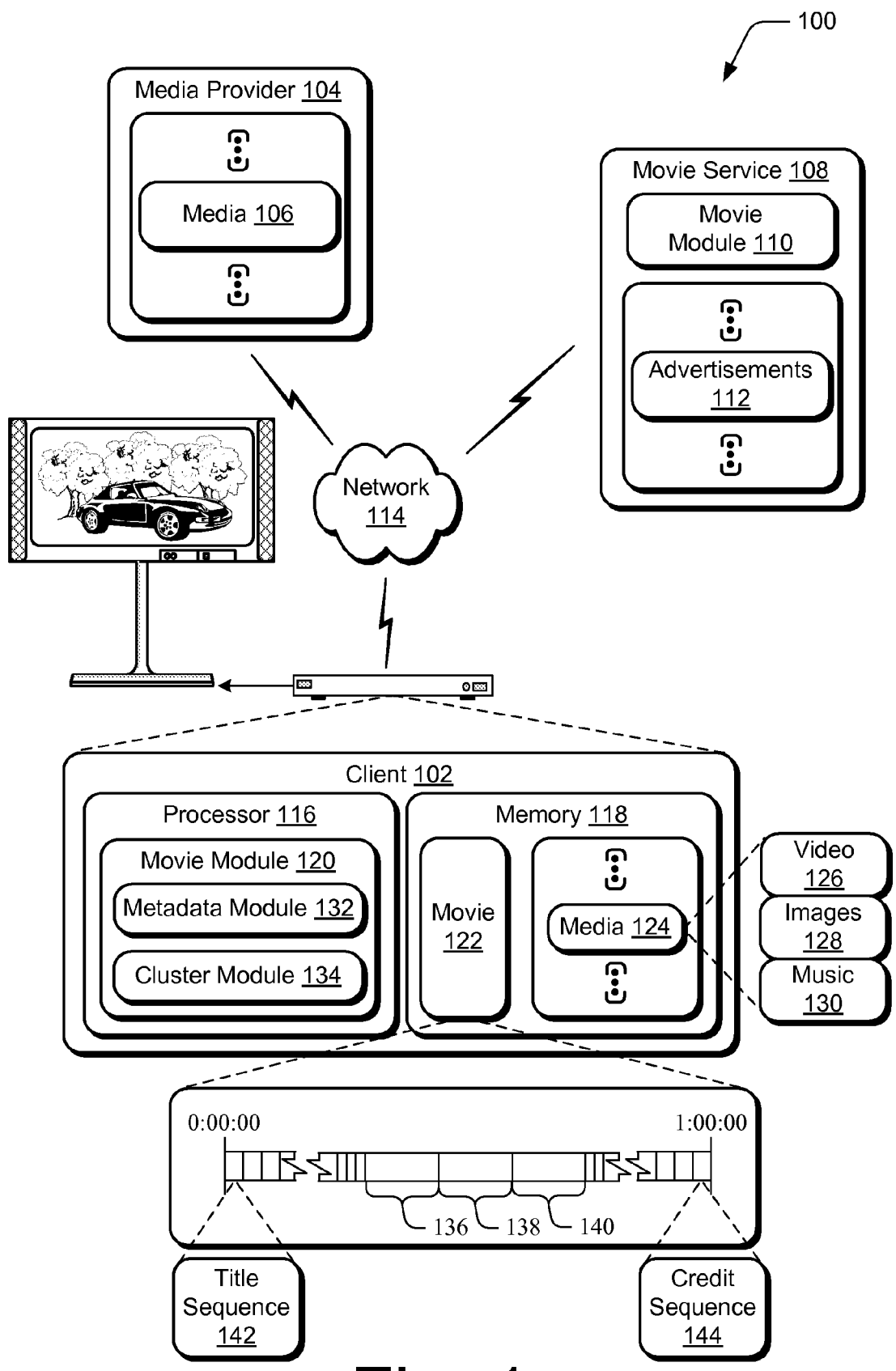
FIG. 1 is an illustration of an environment in an example implementation of a movie module that is operable to perform movie making techniques.

FIG. 1 is an illustration of an environment 100 in an example implementation that is operable to employ movie making techniques. The illustrated environment 100 includes a client 102, a media provider 104 having one or more items of media 106, and a movie service 108 having a movie module 110 and one or more advertisements 112. Additionally, the client 102, the media provider 104 and the movie service 108 are illustrated as being communicatively coupled, one to another, via a network 114.

Although the network 114 is described herein as the Internet, the network may assume a wide variety of configurations. For example, the network 114 may include a wide area network (WAN), a local area network (LAN), a wireless network, a public telephone network, an intranet, and so on. Further, although a single network 114 is shown, the network 114 may be configured to include multiple networks. For instance, the client 102 and the media provider 104 may be communicatively coupled via a broadcast network (e.g., cable, an "over the air" broadcast, satellite, and so on) to communicate, one to another. Additionally, the movie service 108 may be communicatively coupled to the client 102 via the Internet. A wide variety of other instances are also contemplated.

The client 102 may be configured in a variety of ways. For example, the client 102 may be configured as a computing device that is capable of communicating over the network 114, such as a desktop computer, a mobile station, an entertainment appliance, a set-top box communicatively coupled to a display device, a wireless phone, a game console, and so forth. Thus, the client 102 may range from a full resource device with substantial memory and processor resources (e.g., personal computers or game consoles) to a low-resource device with limited memory and/or processing resources (e.g., traditional set-top boxes or hand-held game consoles). The client 102 may also relate to a person and/or entity that operate the client 102. In other words, client 102 may describe a logical client that includes a user, software, and/or device.

The client 102 is further illustrated as including a processor 116 and memory 118. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 118 is shown, a wide variety of types and combinations of memory may be employed, such as random access memory (RAM), hard disk memory, removable medium memory, and other types of computer-readable media.

A movie module 120 is illustrated as being executed on the processor 116, and is storable in memory 118. The movie module 120 is representative of functionality to make a movie 122 from one or more items of media 124. A variety of different media 124 may be used to make the movie 122, such as video 126 (e.g., a home video), images 128 (e.g., digital photographs, clip art, graphic art, or other non-animating documents that could be represented as an image such as spreadsheet tables), music 130, and so on. In an implementation, the movie module 120 is executable to form different aspects of the movie 122 from the media 124, and may do so automatically and without user intervention.

For example, the movie module 120 is illustrated as including a metadata module 132 and a cluster module 134. The metadata module 132 is representative of functionality involving metadata that is associated with the media 124. For example, video 126 may have metadata associated that identifies people included in the video 126, a time and/or location at which the video 126 was taken (e.g., geo-code from a position-determining device such as a GPS compliant device), and so on. Likewise, images 128 and music 130 may also have similar metadata, such as names of people in the images 128, musicians that performed the music 130, and so on. This metadata may be used in a variety of ways, such as by the cluster module 134.

The cluster module 134 is representative of functionality of the movie module 120 to calculate a sequence to output the media 124 to make the movie 122. For example, the movie 122 is illustrated in FIG. 1 as a timeline having a plurality of blocks representing media 136, 138, 140. The cluster module 134 may arrive at an arrangement of the media 136, 138, 140, one to another, utilizing a variety of different techniques without receiving input from a user, such as based on metadata associated with the respective media 136, 138, 140, further discussion of which may be found in relation to FIG. 2.

In another implementation, the sequence may be derived with user input, such as via a user interface output by the movie module 120 to specify a particular outline (e.g., storyboard) to be followed to output the media. For example, a user may interact with the user interface to specify a sequence of actors to be followed such that the media 136, 138, 140 that corresponds to the actors follows that sequence. A variety of other examples are also contemplated, such as by specifying a particular sequence through location, further discussion of which may be found in relation to FIG. 3.

The movie module 120 may also generate a variety of other features for the movie 122 automatically and without user intervention. For example, the metadata module 132 may be executed to generate a title sequence 142 and/or a credit sequence 144 based on metadata associated with the media 136, 138, 140. The title and/or credit sequence 142, 144 may then be included as an integral part of the movie 122, such as through output in sequence with the media 136, 138, 140. In this way, the metadata module 132 may configure metadata associated with media 124 that is to be used to form the movie 122.

Although the movie module 120 is described as being implemented at the client 102, the movie module 120 may be provided in a variety of different ways. For example, the functionality of the movie module 110 may be accessible by the client 102 over the network 114 at the movie service 108. For example, the user may execute a browser on the client 102 to access a webpage of the movie service 108. By interacting with the webpages, the user may specify media 124 that is local to the client 102 and/or media 106 that is remote to the client 102 for inclusion in a movie. The movie module 110 may then employ the functionality previously described to sequence output of the media 106, 124 through execution of a respective cluster module and/or metadata for output as an integral part of the movie 122, such as a title sequence and/or credit sequence.

The movie service 108 is also illustrated as including one or more advertisements 112. The advertisements 112 may be output in conjunction with a user interface output by the movie module 110 to support a revenue model for the movie service 108. For example, advertisers may supply the advertisements 112 to be output in a user interface when particular types of media are being formed into the movie. Additionally, the movie service 108 may also provide functionality to make movies available to other clients over the network 114. For example, the movie module 110 of the movie service 108 may expose movies made at the movie service 108 (and/or locally at the client 102) to be searchable for viewing by other clients, such as by embedding metadata from media 124 used to form the movie 122 in the movie 122 such that a keyword search may be performed. A variety of other examples are also contemplated, further discussion of which may be found in relation to the following figures.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as the memory 118. The features of the movie making techniques described herein are platform-independent, meaning that the techniques may be implemented on a variety of commercial computing platforms having a variety of processors.

Figure 2:
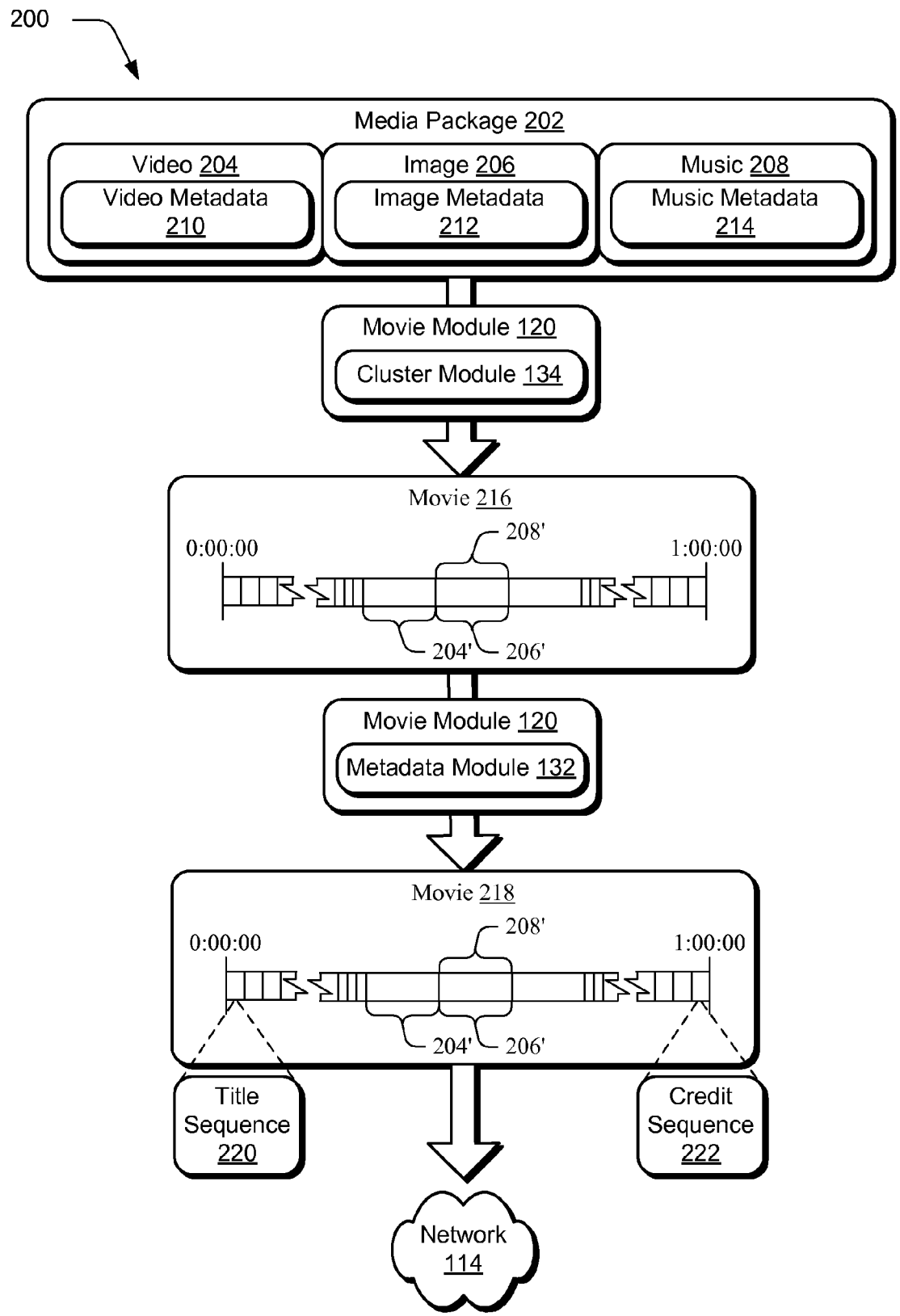
FIG. 2 is an illustration of a system in an example implementation showing implementation of the movie module of FIG. 1 in greater detail.

FIG. 2 depicts a system 200 in an example implementation in which a movie is formed from media through execution of the movie module 120 of FIG. 1. A media package 202 is illustrated that includes video 204, image 206, and music 208 media and is also illustrated as being processed by the movie module 120. The media package 202 may be provided in a variety of ways, such as through interaction with a user interface output through execution of a movie module 120 locally at the client 102 and/or by a movie module 110 that is located remote to the client 102 (e.g., over network 114) by the movie service 108. For example, the user interface may be output as a webpage in a browser that accesses the movie service 108 over the network 114. The user may then interact with the webpage to cause the video 204, image 206, and music 208 media to be uploaded to the movie service 108 and formed into a movie. In the example illustrated in FIG. 1, the movie module 120 is executed locally by the client 102.

The movie module 120 is illustrated as executing the cluster module 134 to form a sequence of media (e.g., the video 204, image 206, and music 208) in the media package 202 for output. For example, the video 204 is illustrated as including video metadata 210, the image 206 is illustrated as including image metadata 212, and the music 208 is illustrated as including music metadata 214. The metadata associated with the media may be used by the cluster module 134 to arrive at a sequence in which to output the media in a form of a movie 216. A variety of different techniques may be employed to arrive at this sequence.

For instance, current digital still and video cameras may stamp the video 204 and image 206 with metadata information include a data and time the media was captured, characteristics used to capture the media (e.g., whether a flash was used, thereby indicating indoors vs. outdoors), a location at which the media was captured (e.g., through position-determining functionality), and so on. This metadata may then be used by the cluster module 134 to cluster "like" media together for a consistent viewing experience, such as locations, actors, type of media, and so forth. Additionally, these clusters may be specified in a hierarchical arrangement, such as to first arrange by location, then actors, then type (e.g., video 204 vs. image 206) and so on to arrive at a sequence to be employed by the movie 216. A sequence is shown in FIG. 2 by movie 216 such that the video 204' is first displayed followed by the image 206' and music 208' together.

The movie module 120 may also provide additional functionality that may be used to form the movie automatically and without user intervention. In the illustrated system 200, the movie module 120 may further process the sequence that was calculated by the cluster module 134 for display of media in the movie 216 to form a movie 218 having a title sequence 220 and a credit sequence 222. For example, the metadata module 132 may analyze the video metadata 210, image metadata 212, and the music metadata 214 to determine a weighting (e.g., which actors appear more often) and then create a display that "rolls" through those actors in order in appearance in the movie 216 based on the sequence calculated by the cluster module 134.

Further, corresponding media may be obtained to supplement the metadata, such video segments or still images taken from video 204 (e.g., a frame from the video) and/or image 206 media to be included in the title and/or credit sequence 220, 222. For instance, a still image may be taken of an actor from the media in the media package 202 and included in the title sequence 220 The supplemental media may also be used compliment a plurality of metadata, such as a single image that includes a plurality of actors in the media. For instance, the movie module 120 may employ a weighting and/or heuristic techniques such that actors that do not appear in the movie 218 above a threshold amount are combined together. Therefore, images may be located that include a plurality of such actors for inclusion in the credit sequence 222. A variety of other examples are also contemplated.

The metadata module 132 may also be configured to "tag" the movie 218 for output. For example, portions of the metadata associated with the media (e.g., the video, image, and music metadata 210, 212, 214 associated with the video 204, image 206, and music 208, respectively) may be included with the movie 218 such that a search may be performed to locate the movie 218 at the movie service 108 based on one or more characteristics. The movie 218, for instance, may be uploaded to the movie service 108 as previously described in relation to FIG. 1. Subsequent users that access the movie service 108 may then perform a keyword search for the movie 218 based on the metadata associated with the movie 218 at the movie service 108, e.g., particular actors, locations, and so on.

Thus, the movie module 120 allows a user to select a set of source media (e.g., the video 204, image, and music 208 media), which is then automatically placed in an ordered storyboard. Additionally, the movie module 120 may add transitions between each media item (e.g., a fade sequence, dissolve sequence, and so on) to produce an immediately playable movie. At this point, the movie 218 may be published to the web by selecting a destination sharing site and providing logon credentials, e.g., the movie service 108 of FIG. 1.

Although a few examples of metadata have been described, it should be readily apparent that the movie module 120 may gather a variety of different metadata from media and aggregate the metadata to provide information which is applicable to the movie being made. For example, the movie module 120 may determine an earliest and latest date and times of when the media items were captured and be use this metadata to provide a summary of what is in the movie 218 such as "Photos and videos from January 2007 through March 2008". In another example, videos and images included in the movie 218 which have been tagged to identify the people in the image may be combined together in a list of who "stars" in the movie 218.

Figure 3:
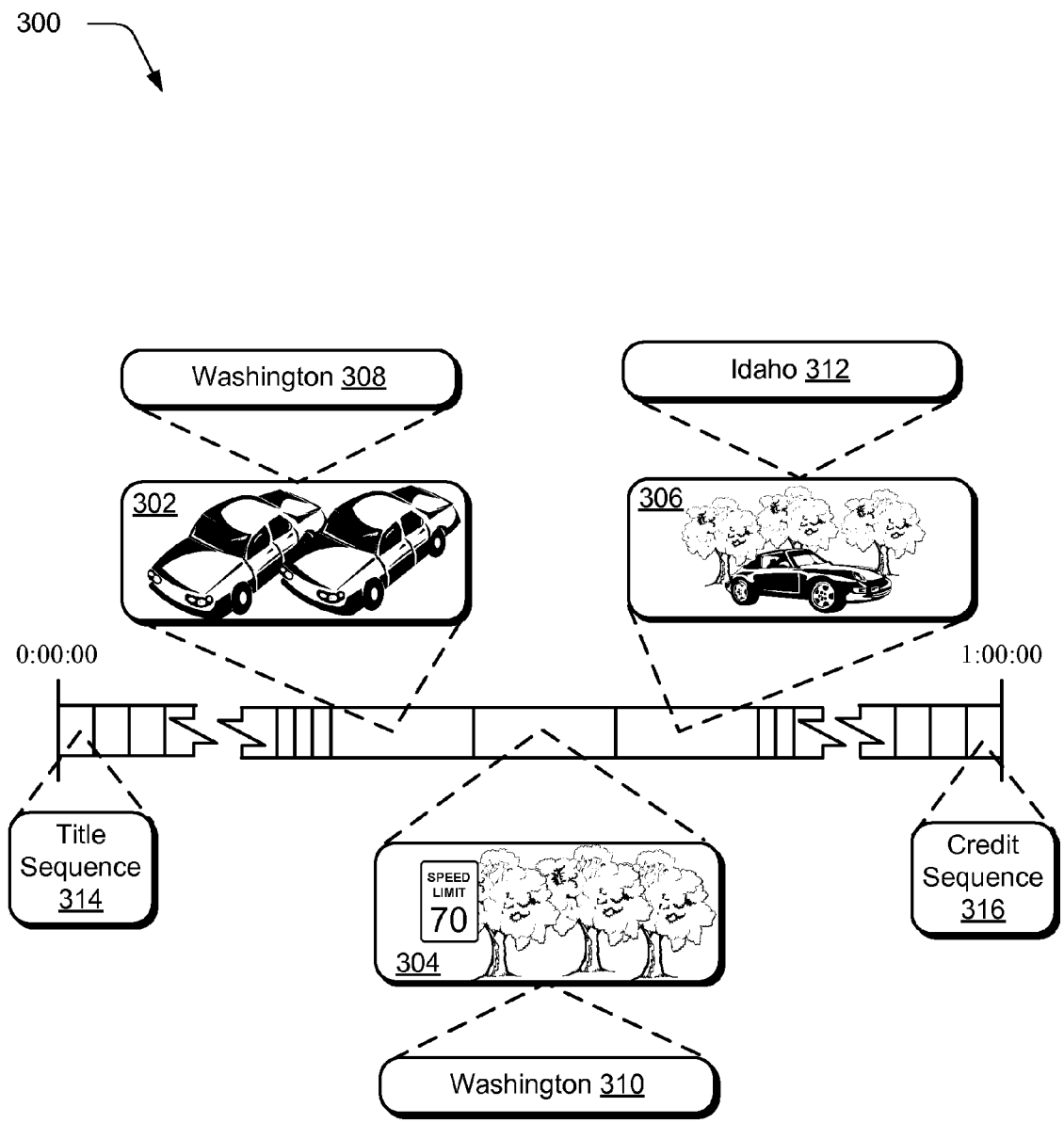
FIG. 3 is an illustration of a system in an example implementation showing example clustering of media to form a movie.

In a further example, location information in metadata of the video 204 or image 206 which are part of the movie may be analyzed, and optionally combined with the date the media was captured, to generate a list of locations included in the movie, which may be output in chronological order. For instance, FIG. 3 depicts a system 300 in an example implementation in which media 302, 304, 306 with similar coordinates that were taken at a similar location are clustered together. For instance, media 302 and 304 that metadata that references Washington 308, 310 are grouped together, and then following with media 306 having metadata that references Idaho 312. Coordinates may also be "reverse geocoded" to translate them into commonly recognized place names such as a point of interest, city, state, and country. The number of source files in a location may also be used to generalize location information, such as "In and around Seattle, Wash.".

A variety of other techniques may also be employed by the cluster module 134 to arrive at a sequence of media, one to another. For example, actors may be distributed evenly throughout the movie such that a particular person appears throughout the movie. In another example, clustering by "actor" may be performed such that media having a particular actor is grouped together. In a further example, media may be sorted by date to keep events in a chronological order. In yet another example, clusters may be formed by "scene" classification (outdoor, indoor, forest, field, lake, portrait, and so on. In an implementation, a user interacts with the user interface to select a particular storyboard outline described in the previous examples. A storyboard may then be created automatically and without user intervention from the media by the movie module 120. A title and credit sequence 314, 316 also may be added.

In one or more implementations the movie module 120 may accept user designation of which metadata is to be used to sequence the media. For example, the cluster module 134 may use a chronological arrangement based on user designation of the chronological arrangement. In another example, the movie module 120 may be configured to accept a user designation based on the metadata extracted from the media. For example, the movie module 120 may permit a user to select which organizing principle is to be used by the clustering module 134 to sequence the media.

Although automatic sequencing of media is described, in one or more implementations, the movie module 120 may be configured to accept manual arrangement of a portion of the movie without implementing manual arrangement for the movie. For example, the cluster module 134 may accept manual arrangement of some of the media items while automatically sorting other media items. Thus, manual arrangement can be accepted while the movie module may still automatically form the movie without user input. A variety of other examples are also contemplated.

Returning now to FIG. 2, once the metadata has been gathered by the movie module 120, a variety of actions may be performed automatically and without user intervention. As previously described, a movie title sequence 220 may be generated that introduces actors that star in the movie, such as a title text "Staring . . . " followed by images or videos of each person in the movie, with each photo being associated with title text having their name. For example, the text may be overlaid over an image or a portion of video including each person in the movie. A credit sequence 222 (e.g., credit "roll") may also be generated and placed at the end of the movie. For instance, the credit sequence 222 may be configured as follows:
  a. "stars in order of appearance" section;
  b. "shot on location in" section with location and dates;
  c. "equipment" section (e.g., a camera make and model list);
  d. "music" section (derived from files used for soundtrack); and
  e. "produced by" with a user's "friendly" name (login ID) and location (e.g., derived from computer IP).

Metadata may also be added to the movie, which may include:
  a. actors/staring list derived from tagged people in source media;
  b. date taken range;
  c. location list (e.g., use GPS coordinates to generate a list of cities);
  d. producer (e.g., login ID to movie service 108 and/or client 102);
  e. release date (e.g., date the movie 218 was published and/or saved);
  f. equipment list (e.g., camera make/model list);
  g. software used (e.g., marketing name of movie module 120 and/or movie service 108); and
  h. soundtrack (e.g., a list of artists and titles of music making up the soundtrack).

The metadata may be included in a variety of ways, such as for output as an integral part of the movie 218 (e.g., the title and/or credit sequence 220, 222), employed as tags to enable keyword searching, and so on. In some implementations, the metadata may be heuristically edited based on an amount of metadata that is to be included in the movie 218, a length of the movie 218, and so on. A variety of other examples are also contemplated, further discussion of which may be found in relation to the following procedures.

Example Procedures

The following discussion describes movie making techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3, respectively.

Figure 4:
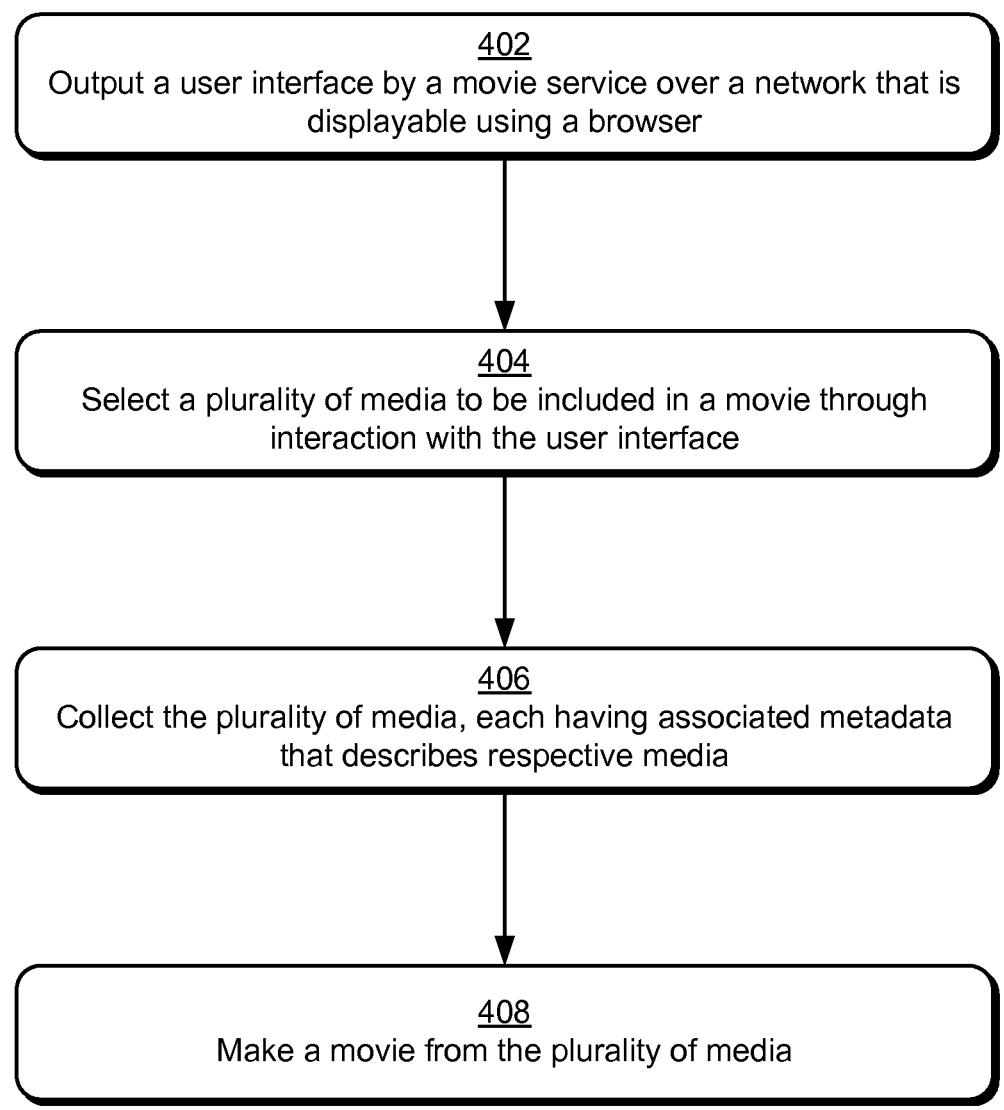
FIG. 4 is a flow diagram depicting a procedure in an example implementation in which a user interface is output via a browser to make a movie automatically, without user invention, from a plurality of media.

FIG. 4 depicts a procedure 400 in an example implementation in which the user interface is output via a browser to make a movie automatically and without user invention from a plurality of media. The user interface is output by a movie service over a network that is displayable using a browser (block 402). For example, a webpage may be output by the movie module 110, the movie service 108 and communicated via network 114 for output by client 102. In another example, a movie module 120 may be executed locally at the client 102.

A plurality of media is selected to be included in a movie through interaction with the user interface (block 404). The media may be selected from a variety of different sources to choose media 124 that is local to the client 102 and/or media 106 that is located remotely from the client 102 over the network 114.

The plurality of media is collected, each having associated metadata that describes respective media (block 406). Continuing with the previous example, the movie module 110 be received an upload of the media 124 from the client 102, may obtain media 106 from the media provider 104 via the network 114, and so on. A movie may then be made from the plurality of media (block 408). A variety of different techniques may be used to make a movie from the media, an example of which may be found in relation to the following figure.

Figure 5:
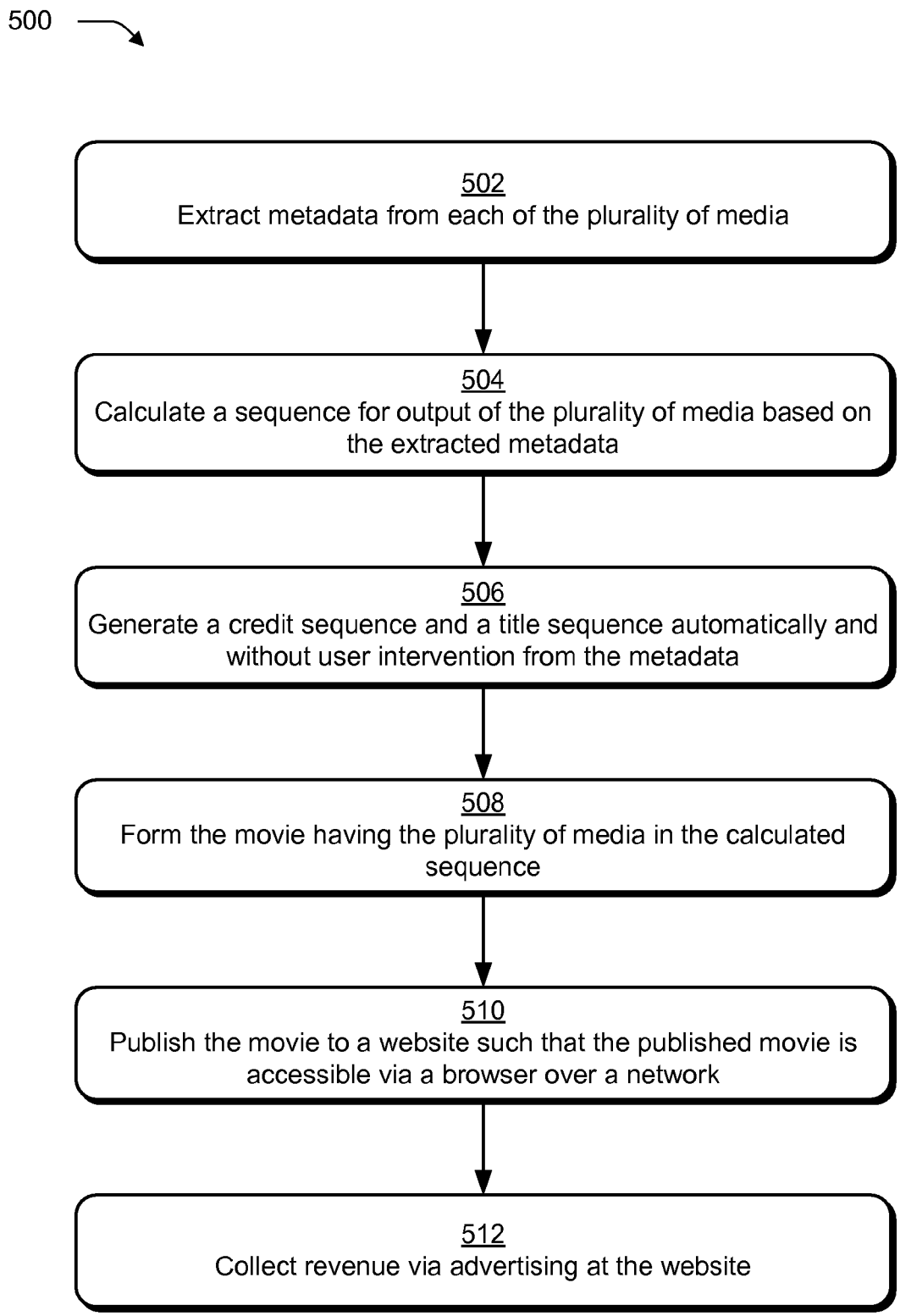
FIG. 5 is a flow diagram depicting a procedure in an example implementation in which a movie is made by leveraging metadata associated with media that is to be used to form the movie.

FIG. 5 depicts a procedure 500 in an example implementation in which a movie is made by leveraging metadata associated with media that is to be used to form the movie.

Metadata is extracted from each of a plurality of media (block 502). A sequence is then calculated for output of a plurality of media based on the extracted metadata (block 504). As previously described, a variety of different techniques may be used to calculate the sequence that is to be used to output the media. Although the sequence may be automatically calculated, in some instances user input may be received to designate an ordering principle. For example, the sequence may be calculated so that a particular actor appears throughout the movie, the movie is presented in a dated order, and so on. In this way, the cmovie module may accept user designation of the ordering principle while the movie is formed automatically. A variety of other examples are also contemplated.

A credit sequence and a title sequence are generated automatically and without user intervention from the metadata (block 506). A movie may then be formed having a plurality of media in the calculated sequence (block 508).

The movie may then be published to a website such that the published movie is accessible via a browser over network (block 510). As previously described. The movie 122 may be communicated over the network 114 for exposure by the movie service 108. In an implementation, revenue is collected be advertising at the website (block 512). For example, the movie service 108 may collect revenue for output of advertisements 112 concurrently with the movie 122, at an initial login page of the movie service 108, and so on.

In another example, a user of the client 102 may obtain a portion of the revenue collected through advertising in conjunction with the movie 122 by the movie service 108. Thus, in this example the movie service 108 may share revenue with the client 102 that is collected to output of one or more of the advertisements 112. A variety of other examples are also contemplated without departing from the spirit and scope thereof.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method performed by a computing device comprising:
extracting metadata from each of a plurality of media;
determining relationships among the plurality of media using the extracted metadata to calculate a sequence for outputting each of the plurality of media;
forming a movie in which each of the plurality of media is arranged for output according to the calculated sequence; and
generating a credit sequence to be included at an end of the formed movie and as part of the formed movie using at least a portion of the metadata to form text credits that are listed in the credit sequence and describe the plurality of media included in the movie.

2. A method as described in claim 1, further comprising outputting a user interface configured to receive one or more input to select the plurality of media to be included in the movie.

3. A method as described in claim 1, wherein the user interface is configured to be output over a network for display in a browser by a client.

4. A method as described in claim 1, wherein the media includes video, images, or music.

5. A method as described in claim 1, wherein the metadata describes one or more people included in the media.

6. A method as described in claim 1, wherein the metadata describes a location at which a respective said media was captured.

7. A method as described in claim 1, further comprising generating a title sequence to be included as a part of the formed movie using at least a portion of the metadata.

8. A method as described in claim 1, further comprising collecting the plurality of media to be included in the movie over a network from a client device.

9. A method as described in claim 1, further comprising collecting the plurality of media to be included in the movie from storage of the computing device.

10. A method implemented by one or more computing devices of a movie service, the method comprising:
choosing one or more advertisements to be included in a user interface of the movie service, the user interface configured to:
form a movie from a plurality of media received via the user interface based on metadata associated with respective said media; and
generate a credit sequence automatically and without user interaction to be included at an end of the formed movie and as part of the formed movie using at least a portion of the metadata to form text credits that are listed in the credit sequence and describe the plurality of media included in the movie; and
forming the user interface by the movie service for output by a client device to include the chosen one or more advertisements.

11. A method as described in claim 10, further comprising collecting revenue by the movie service responsive to the forming.

12. A method as described in claim 10, wherein the choosing is based at least in part on the metadata associated with the respective said media.

13. A method as described in claim 10, wherein the user interface is configured to be output over a network for display in a browser by the client device.

14. A method as described in claim 10, wherein the media includes video, images, or music.

15. A method as described in claim 10, wherein the metadata describes one or more people included in the media.

16. A method as described in claim 10, wherein the metadata describes a location at which a respective said media was captured.

17. A method as described in claim 10, further comprising generating a title sequence to be included as a part of the formed movie using at least a portion of the metadata.

18. A method performed by one or more computing devices of a movie service, the method comprising:
collecting a plurality of media via a network through interaction by a client with a user interface of the movie service;
forming a movie from the collected media having a sequence based on metadata extracted from the collected media;
generating a credit sequence to be included for output as part of the formed movie using at least a portion of the metadata to form text credits that are listed in the credit sequence and describe the plurality of media included in the movie;
tagging the movie with tags corresponding to the metadata extracted from the collected media that is used to form the movie automatically and without user intervention by the movie service such that the movie is searchable for viewing; and exposing the tagged movie to be available for viewing via the movie service by other clients.

19. A method as described in claim 18, wherein the tagging is performed such that the movie is configured to be located responsive to one or more inputs received from the other clients via a keyword search.

20. A method as described in claim 18, wherein the exposed movie is available via a user interface of the movie service that includes one or more advertisements chosen to correspond to one or more items of media used to form the movie.

\* \* \* \* \*